(12) United States Patent
Schmidt

(10) Patent No.: US 9,395,248 B2
(45) Date of Patent: Jul. 19, 2016

(54) RADIATION SENSING DEVICE AND CONTROL CIRCUIT

(75) Inventor: Wolfgang Schmidt, Wiesbaden (DE)

(73) Assignee: Excelitas Technologies Singapore Pte. Ltd, Singapore (SG)

( * ) Notice: Subject to any disclaimer, the term of this patent is extended or adjusted under 35 U.S.C. 154(b) by 0 days.

(21) Appl. No.: 14/119,501

(22) PCT Filed: May 24, 2012

(86) PCT No.: PCT/EP2012/059719
§ 371 (c)(1),
(2), (4) Date: Dec. 5, 2013

(87) PCT Pub. No.: WO2012/160141
PCT Pub. Date: Nov. 29, 2012

(65) Prior Publication Data
US 2014/0145081 A1    May 29, 2014

(30) Foreign Application Priority Data
May 24, 2011   (DE) .................. 10 2011 076 420

(51) Int. Cl.
| | |
|---|---|
| *G01J 5/08* | (2006.01) |
| *G01J 5/00* | (2006.01) |
| *F21V 23/04* | (2006.01) |
| *G08B 13/19* | (2006.01) |
| *F21S 6/00* | (2006.01) |
| *F21S 8/00* | (2006.01) |
| *F21S 8/04* | (2006.01) |

(Continued)

(52) U.S. Cl.
CPC ............ *G01J 5/0896* (2013.01); *F21V 23/0442* (2013.01); *G01J 5/0025* (2013.01); *G01J 5/0806* (2013.01); *G08B 13/19* (2013.01); *F21S 6/00* (2013.01); *F21S 8/033* (2013.01); *F21S 8/04* (2013.01); *F21S 8/06* (2013.01); *F21Y 2101/02* (2013.01); *F21Y 2105/008* (2013.01)

(58) Field of Classification Search
CPC ... F21V 23/0442; G01J 5/0806; G01J 5/0896; G08B 13/19; F21Y 2101/02; F21Y 2105/008
See application file for complete search history.

(56) References Cited

U.S. PATENT DOCUMENTS

| | | | |
|---|---|---|---|
| 4,912,331 A * | 3/1990 | Owers | ........................... 250/353 |
| 5,763,872 A | 6/1998 | Ness | |

(Continued)

FOREIGN PATENT DOCUMENTS

| | | |
|---|---|---|
| DE | 19607872 A1 | 8/1999 |
| DE | 102010003503 A1 | 11/2010 |

(Continued)

*Primary Examiner* — David Porta
*Assistant Examiner* — Mindy Vu
(74) *Attorney, Agent, or Firm* — Peter A. Nieves; Sheehan Phinney Bass & Green PA

(57) ABSTRACT

A radiation sensing device for sensing first radiation (15) comprises a radiation sensor (11) for sensing the first radiation and at least one first radiation guiding member (13) forming at least a part of a first radiation path for guiding, and preferably converging or focusing, the first radiation towards the sensor. The first radiation guiding member (13) also forms at least a part of a second radiation path for guiding second radiation emitted by an illumination device (12). A control circuit (20) comprises a first sensor circuit (21) for operating one or more radiation sensors (11), an illumination circuit (22) for operating one or more illumination devices (22), and at least one connection (26) amongst said circuits (21, 22).

37 Claims, 2 Drawing Sheets

(51) Int. Cl.
*F21S 8/06* (2006.01)
*F21Y 101/02* (2006.01)
*F21Y 105/00* (2016.01)

(56) References Cited

U.S. PATENT DOCUMENTS

| | | | |
|---|---|---|---|
| 6,082,894 A | 7/2000 | Batko | |
| 7,321,120 B1 | 1/2008 | Gorman | |
| 2004/0112940 A1* | 6/2004 | Caddell et al. | 228/103 |
| 2005/0200494 A1 | 9/2005 | Hermann et al. | |

FOREIGN PATENT DOCUMENTS

| | | |
|---|---|---|
| EP | 0296766 A2 | 12/1988 |
| EP | 0935145 A1 | 8/1999 |
| EP | 2500639 A2 | 9/2012 |
| GB | 2215454 A | 9/1989 |
| JP | S55080727 U | 6/1960 |
| JP | S57104827 A | 6/1982 |
| JP | H07294664 A | 11/1995 |
| JP | H08-167480 A | 6/1996 |
| JP | H08254461 A | 10/1996 |
| WO | 2005031894 A2 | 4/2005 |

* cited by examiner

RADIATION SENSING DEVICE AND CONTROL CIRCUIT

BACKGROUND

The present specification relates to a radiation sensing device and to a circuit according to the preambles of the independent claims.

SUMMARY OF THE INVENTION

Radiation sensing devices are often used for motion and presence detection. Often, detected radiation is infrared radiation (wavelength above 800 nm, preferably above 1.5 µm, preferably below 20 µm or below 10 µm). Motion or presence detection can, for example, be used for lighting control or for intrusion detection.

Often, motion and presence detection uses radiation signal change for distinguishing the relatively quickly changing signal part irradiated by a person to be detected from the relatively slowly changing background radiation. For obtaining a changing signal also in response to little movements, an imaging of the space sector to be monitored on one of plural sensor elements arranged according to the desired resolution is necessary, or an optical fragmentation of the space to be monitored is required so that different portions of the space to be monitored are alternately imaged on one and the same sensor element. Thus, for rendering powerful motion and presence detection, the detecting devices require sufficient sensitivity and imaging or space sectoring capabilities according to the desired detection resolution.

Infrared sensing elements are often not sensitive to temperature itself but rather towards temperature gradients over time or over distance. For obtaining such gradients, motion detectors either used imaging techniques of imaging space to be monitored on one of plural sensing elements, or use fragmentation techniques of fragmenting a space to be monitored in plural space fragments through appropriate optics so that changes occur as a radiation source enters or leaves a fragment of the monitored space. The more fragments are formed, the better is the spatial resolution. Since fragmentation is achieved by optical means, fragments depend on focussing properties. With long focal lengths, much better fragmentation can be achieved compared to short focal lengths because with long focal lengths, plural individual fragments, that could also be formed with short focal lengths, can better be separated from each other in their sensing effect. A side effect of the long focal lengths is the wider aperture and thus a higher absolute signal level.

Accordingly, for rendering at the same time sufficient spatial sensitivity (i.e. high fragmentation) and a high signal amplitude, a long focal length of the imaging system is necessary. The recommendable long focal lengths, however, make such sensors large and thus easily recognizable. Insofar, motion detectors are often seen as an aesthetic problem and lack acceptance in architectural planning.

It is the object of the invention to provide a radiation sensing device of good spatial sensitivity and resolution that is hard to recognize.

This object is accomplished by the features of the independent claims. Dependent claims are directed on preferred embodiments of the invention.

A radiation sensing device has optical path forming means preferably of radiation converging or focusing nature for incoming/received radiation. The path forming means may also be used by an illumination device for emitted radiation and/or is formed in an illumination apparatus or is formed as a unit with a reflector of an illumination apparatus.

More in detail, a radiation sensing device for sensing a first radiation, preferably infrared radiation, comprises a radiation sensor for sensing the first radiation, and a radiation guiding member forming at least a part of a first radiation path for guiding, and preferably converging or focusing, the first radiation towards the sensor. The first radiation guiding member also forms at least a part of a second radiation path for guiding second radiation, preferably in the visual range, emitted by an illumination device, and/or is formed in an illumination apparatus or is formed as a unit with a reflector of, and used by, an illumination device.

With such a construction, the radiation sensing device can use the path shaping components of the illumination device or can use the illumination installations as "masking" or "hideout" of the detecting structure. Illumination apparatuses are accepted in their presence and are relatively large anyway so that relatively easy also optical paths of long focal length can be formed and accommodated in such devices.

The electric/electronic part of the radiation sensing section can be formed close to, and preferably as a unit with, the electric/electronic part of the illumination section so that the radiation sensing section is not recognizable as a separate unit. The radiation sensor and the illumination device may be provided on a common substrate which may be a common circuit board or a common unit. Thermal isolation may be provided between the sensing section and the illumination section. The illumination device may be or comprise one or an array of spot type illumination devices, preferably one or more LEDs or OLEDs. For presence detection, the use of pyrodetectors is preferred.

A control circuit for a combined radiation sensing and radiation emitting device, preferably as described in this specification, has control sections both for a radiation sensor and for an illumination device, the control sections being interconnected for signal and information exchange.

More in detail, the control circuit comprises a sensor circuit for operating one or more radiation sensors, an illumination circuit for operating one or more illumination devices and a connection amongst said circuits.

Such a control circuit is practically useful when a radiation sensor and an illumination device are close together (such as being formed as a unit or using common radiation guiding members), so that signal exchange amongst sensor circuit and illumination circuit can easily be accomplished, for example for controlling the illumination in accordance with sensed signals.

The illumination device may be a more or less designed illumination device for regular room illumination and may be mountable—together with the sensor section—at a wall or under a ceiling of a room or may be suspendable therefrom or may be a floor lamp.

An illumination apparatus comprises a radiation sensing device for sensing a first radiation, preferably infrared radiation, by a radiation sensor, at least one first radiation guiding member forming at least a part of a first radiation path for guiding, and preferably converging or focusing, the first radiation towards the sensor, and an illumination device, wherein the first radiation guiding member may also form at least a part of a second radiation path for guiding second radiation, preferably in the visual range, emitted by the illumination device, or may be formed in the illumination apparatus or may be formed as a unit with a radiation guide of an illumination apparatus. The illumination device may or may not have a radiation guiding member for emitting its radiation.

BRIEF DESCRIPTION OF THE DRAWINGS

In the following, embodiments of the invention will be explained with reference to the attached drawings in which.

DETAILED DESCRIPTION

Figure 1:
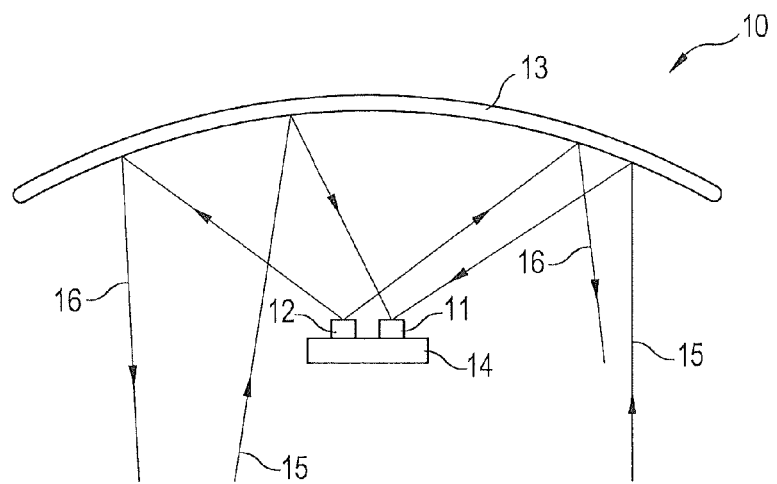
FIG. 1 is a schematic side view of a radiation sensing device.

FIG. 1 shows schematically in side or cut view an embodiment of the radiation sensing device. In FIG. 1, 10 symbolizes the overall radiation sensing device. It comprises a radiation sensor 11 that may be a housed infrared radiation sensor built into a circuit. 12 is an illumination device, or at least a socket thereof. 13 is a first radiation guiding member, formed as a reflector in the shown embodiment. 14 is a substrate carrying in the shown embodiment both the sensor 11 and the illumination device 12. 15 symbolizes first radiation travelling towards radiation sensor 11 along the shown path (first radiation path). 16 symbolizes second radiation emitted by the illumination device, preferably in the visual range (400 nm to 800 nm) along the shown path (second radiation path).

An illumination apparatus comprises at least the illumination device and possibly also a reflector, mounting means and other components. The first radiation guiding member is formed as a unit with the illumination apparatus.

Further, FIG. 1 shows an embodiment in which the first radiation guiding member 13 is commonly used for guiding incoming radiation (infrared radiation) towards sensor 11 and for guiding emitted radiation (visible light, mixture of wavelength, preferably 400 nm-800 nm) away from the illumination device 12.

The radiation guiding member 13 may, but needs not necessarily be of focusing or converging nature. It may consist of different sections with different focal lengths. The focal length of the overall radiation path may be higher than 20 mm or higher than 35 mm or higher than 50 mm. Illumination reflectors usually have focal length of such dimensions so that by using illumination reflectors also for guiding incoming radiation towards a sensor, such sensing devices have relatively long focal length so that they have both sufficient detecting sensitivity and satisfying spatial fragmentation for obtaining the desired changes of temperature at the sensor elements of the sensor. Besides, since the sensing structure is integrated into the illumination structure it is per se not separately recognizable so that acceptance problems are avoided. The outer appearance of the overall device may be that of a regular illumination device.

Figure 2:
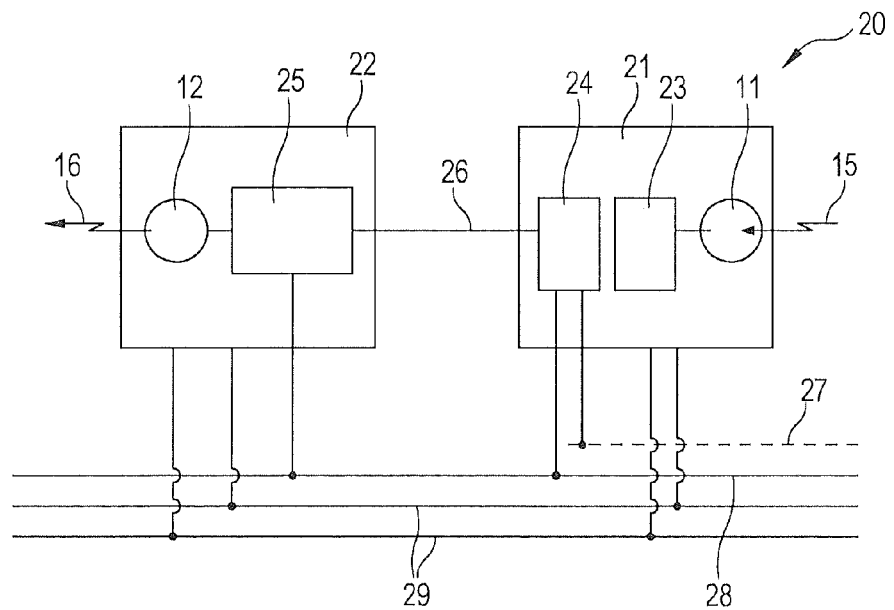
FIG. 2 shows a schematic embodiment of an electric/electronic layout.

Not shown in FIG. 1 are holding structures that hold member 13 and structure 11, 12, 14 in a certain spatial relationship with respect to each other. Certainly, such holding structures are provided for maintaining the desired relative positional relationship amongst the involved components FIG. 2 shows, as a block diagram, a possible circuitry of a control circuit 20. 11 is the radiation sensor receiving IR radiation 15. 12 is the illumination device emitting radiation 16, preferably in the visible range, and preferably being a mixture of wavelengths/frequencies. The shown structure is a control circuit for the one or more sensors 11 and for the one or more illumination devices 22. Sensor(s) 11 and illumination device(s) 12 may have, as shown, a common power supply 29 (DC or AC), or may have separate power supplies. Likewise, they may have a common signal supply line 28 used with appropriate multiplexing, or they may have separate signal supplies 27. Signal supply may include both signals towards the respective units or signals away from the respective units.

The circuitry comprises a first sensor circuit 21 for operating one or more radiation sensors 11. The sensor circuit 21 may comprise a signal processing circuit 23 and an interface circuit 24. The signal processing circuit 23 may receive signals from the sensor 11 and may supply signals to the sensor 11. It may comprise an analogue/digital-conversion-circuit (analogue towards the sensor). It may comprise a digital signal processing circuit for formatting, compensating, correcting and multiplexing signals towards and from the sensor 11. It may comprise a memory for holding program data, control data or control parameters. The memory may, at least in parts, be rewritable, and may, at least in parts, be resident. The interface circuit 24 may receive signals from external and may supply signals towards external. It may have a connection to a dedicated control line 27 and/or to a common control line 28. It also may have a superimposing circuit for superimposing signals (such as modulated AC) on power (AC or DC) on a power supply line 29, or it may have a wireless interface portion. Besides, it may have a direct connection to the illumination circuit 22. It is also connected to the signal processing circuit 23.

The illumination circuit 22 may have a illumination device control circuit 25 which may be or comprise an on/off-switch for the illumination devices 12, dimming circuitry or the like. It may receive its commanding signal from a control line 28 or directly from the sensor circuit 21 through line 26.

The illumination circuit 22 and the first sensor circuit 21 may be formed as a unit. They may be formed on separate or on the same circuit board. They also may share components, for example a digital control component (digital integrated circuit, digital controller), and may have different, at least in parts analogue outputs towards illumination device 12 and sensor device 11. It may be or comprise an application specific integrated circuit (ASIC).

The illumination circuit 22 may be adapted to switch on illumination in accordance with a detection signal from the sensor circuit 21. It may further comprise a timer for switching off illumination after a certain while after the latest detection. It may further be adapted to receive a control signal from a remote sensor circuit, such a sensor circuit being formed as sensor circuit 21 shown in FIG. 2. The illumination devices 12 may comprise one or more illumination means or control terminals thereof. At least some of the illumination means may be formed remote, particularly on a separate substrate, and receive their driving signals from the illumination circuit 22 through an appropriate line or channel.

Besides the radiation sensor 11, also a temperature sensor (not shown) may be provided, for example inside the radiation sensor 11 or separately from it. A second sensor control circuit (not shown) for operating the temperature sensor 11 may be provided. It may be implemented also through multiplexing/time-sharing by the radiation sensor control circuit 21. Both temperature signal and radiation signal may be used for controlling the illumination device 12. Likewise, the temperature signal may be used for controlling signal processing of the radiation sensor signal, for example, correcting the radiation sensor signal in accordance with the temperature sensor signal or the like.

Power supply may be DC power supply or AC power supply. It may be converted to the required supply within the respective circuits (rectification, levelling).

The radiation sensor 11 may be or comprise a sensor element formed by a thermopile or a bolometer or a pyrodetector or a photodiode or an infrared diode. It may comprise one such sensor element or an array of plural such sensor elements. The sensor 11 may have a standard housing such as TO5, or it may be formed as a surface mountable device (MO). It may have a specific radiation entrance window. The illumination device 12 may be or comprise one or an array of a spot type illumination device, preferably one or more LEDs or OLEDs or may comprise a fluorescent lamp. For presence detection, the use of pyrodetectors is preferred.

Figure 3:
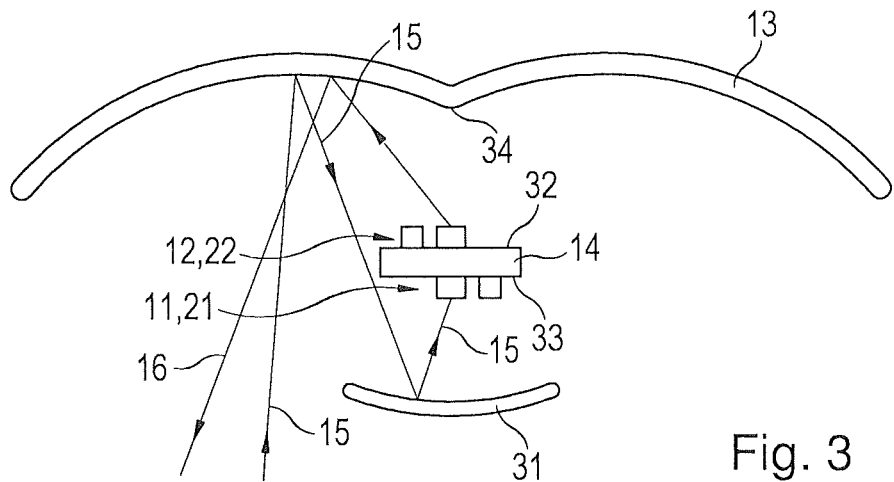
FIG. 3 shows a certain radiation guiding embodiment.

FIG. 3 shows schematically in a cut view another embodiment of the radiation sensing device. It comprises the first radiation guiding member 13 and a second radiation guiding member 31. The first radiation guiding member 13 may be used, as described before, both for incoming radiation towards the sensor and for outgoing radiation away from the illumination devices 12. The second radiation guiding member 31 may be used only for guiding radiation 15 towards the sensor 11. The arrangement of sensor 11 and illumination device 12 may be such that they are placed on opposing surfaces of a unitary body. The second radiation guiding member 31 may also be a reflecting member, particularly a mirror that, depending on geometry, may be a plane mirror or a concave mirror or a convex mirror or a facetted mirror.

Generally speaking, when plural radiation guiding members are provided, at least one of them is provided in an illumination apparatus and may preferably be used both for incoming and outgoing radiation 15 and 16, whereas one or more others may be provided elsewhere or are used only for one of them.

It is pointed out in this respect that the areas or spatial sectors monitored by the sensor 11, on the one hand side, and the room parts illuminated by the illumination device 12, on the other hand side, may, but need not necessarily coincide. For presence detection it is not always necessary that the radiation sensor looks into those sectors of space that are irradiated by the illumination device. Rather, the overall radiation guiding arrangement may, for example, be such that the illumination is guided towards certain (central) areas or sectors, whereas the sensors sensitivity is maximum in other, e.g. peripheral, areas or sectors of space.

The first radiation guiding member 13 may have a smooth surface or may have, as shown in FIG. 3, bent points or lines or a vertex 34 for optimizing the geometry for the emission characteristics of the overall illumination device.

The first radiation guiding member 13 and/or the second radiation guiding member 31 may be facetted, i.e. having plural relatively small surface portions with edges between them so that the desired space segmentation for radiation detection is accomplished.

Both radiation guiding members may be mirrors or other bodies with reflecting surfaces. Their reflecting surfaces may face each other. The sensor 11 and the illumination device 12 may be provided between the two radiation guiding members 13, 31. The first radiation guiding member 13 may also be formed by plural members, assembled into an operational unit. Again, holding means are provided for holding the involved components in a desired special relationship. Such components are not shown in FIG. 3, but are, of course, provided. The second radiation guiding member 31 may directly be attached to the sensor, for example by clipping it onto the sensor housing.

The radiation guiding members may be shaped symmetrically or asymmetrically. The symmetry may be a line symmetry or a rotation symmetry. Not shown in FIGS. 1 and 3 are the electric and electronic power and signal supply lines 27, 28 and 29 shown in FIG. 2. But of course, they are also provided as needed.

Generally speaking, the one or more radiation guiding members may comprise mirrors/reflecting surfaces. But one or more of them may also be a lens or a Fresnel lens or a phase plate or an interference grid. The overall focal length for the radiation sensor may be longer than 20 or longer than 25 or longer than 30 or longer than 35 mm. It may be longer than 50 mm. It may be shorter than any of 300 mm, 200 mm, 150 mm or 100 mm. The overall focal length may be achieved by a combination of the mentioned first and/or second radiation guiding member 13, 31, and possibly by an optical element provided at the sensor itself.

The sensor is usually a housed component, the housing having a radiation entrance window closed by a radiation permeable material. For infrared sensing, silicon or some kind of resin may be chosen as material. The window at the sensor itself may have no focussing properties at all, then usually being a flat plate, so that then the focussing length would have to be rendered by the first and second being guiding members 13, 31.

The focal length as addressed in this specification may be understood as commonly defined in optics for lens or mirror systems. In connection with a sensing detector, it may, however, also be understood as the distance of the sensing elements of sensor 11 from the beam guiding member, and particularly from the remotest beam guiding member, if plural of them are provided in the radiation path towards the sensor 11 (13 in FIGS. 1 and 3). The individual beam guiding members may have different focal lengths to address the needs of fragmentation and illumination. If the distance or focal length is not constant across the effective (radiation receiving) aperture of the sensor 11, the average or largest or smallest distance or focal length may be taken as focal length.

Figure 4:
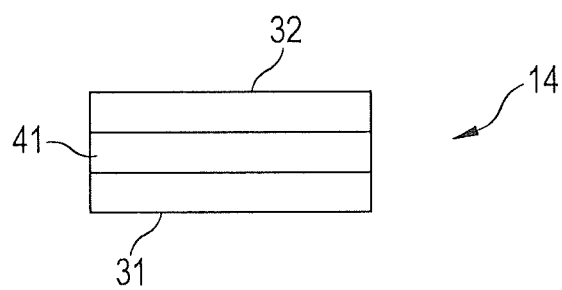
FIG. 4 shows a unit of radiation sensor and illumination device.

FIG. 4 shows schematically a substrate for carrying a sensor 11 and illumination device 12. It comprises distinct portions 32 and 33 which may be principle surfaces of a flat structure. The one portion or principle surface 32 carries the illumination device, the other portion or principle surface 33 carries the sensor 11. Thermal isolation means 41 may be provided between them and separate the portions. The thermal isolation may comprise a heat flow barrier and/or may comprise a radiation barrier. The radiation barrier may be an appropriate shading member for avoiding radiation directly or indirectly generated by the illumination device directly or indirectly entering the sensor. The heat flow barrier may be some kind of insulating substance or structure with high heat flow resistance so that waste heat generated in the illumination device is reduced or suppressed from reaching the radiation sensor. The heat flow barrier may, for example, be an air gap 41 or similar installations.

Also heat flow distribution means may be provided for shaping or equalizing heat flow from the illumination device 12 towards the sensor 11. When the heat flow cannot completely be suppressed, it may be preferable to shape it in a defined manner (for example equalizing it across a certain cross-section) so that the radiation sensor experiences known temperatures or temperature gradients. For example, heat flow distribution means may be formed as a heat flow barrier with differing heat flow resistances at different portions thereof.

One of the radiation guiding members 13, 31 may be adjustable in its radiation guiding direction(s) and/or regarding its focusing properties. Preferably the second radiation guiding member 31 may be adjustable. It may be desired to direct the focussing region for the sensor to another region than that of the illumination device. Insofar, the first and/or the second radiation guiding member 31 may be adjustable in its orientation or attitude or may comprise an adjustable shading.

Figure 5A:
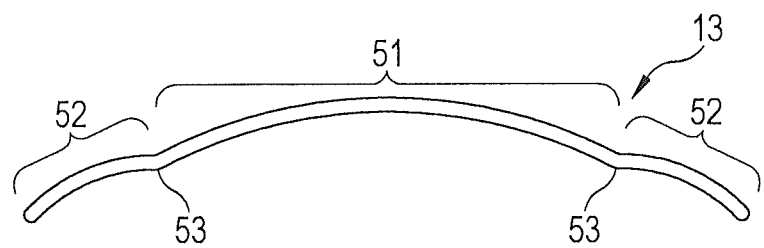
FIG. 5 shows an embodiment of a radiation guiding member.

FIG. 5 shows embodiments of radiation guiding members. FIG. 5a may be the commonly used first radiation guiding member 13. It may have different portions 51 and 52. One or more portions 51, preferably in a central area of the radiation guiding member 13, are primarily shaped and optimized for guiding radiation 16 emitted by the illumination device 12, whereas one or more portions 52, preferably shaped in the peripheral area of the radiation guiding member 13, is primarily shaped and optimized for guiding radiation towards the sensor 11. The transition 53 amongst areas 51 and 52 may be a recognizable bent or corner or may be smooth. It is pointed out that nevertheless both regions 51 and 52 may receive and reflect both incoming radiation to be sensed by sensor 11 and outgoing radiation emitted by illumination device 12. But in their attitude they may, respectively, be optimized for the one or the other of them.

Figure 5B:
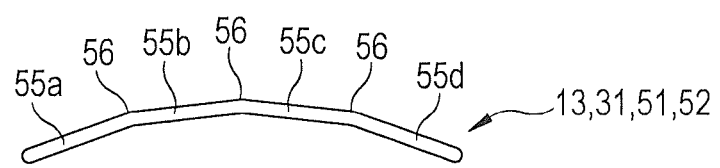

FIG. 5b shows schematically a cross section through a facetted radiation guiding member which may be a facetted mirror or a facetted reflective surface. It may be the first or second radiation guiding member 13, 31, or a portion 51, 52 thereof. It comprises discernable regions or facets 55a, 55b, 55c and 55d with recognizable transitions 56 amongst them. The transitions 56 may be slight bents or vertexes amongst the respective facets. The optical axes of the respective facets may non-parallel amongst each other so that they "look" into different space sectors and respectively image the respective sector onto the radiation sensing element. The relatively long focal length provides for a clear separation of the effect of radiation from the respective sectors. Nevertheless, also when only one facet is provided, the long focal length is beneficial in providing a narrow monitoring sector from which a clearly discernible signal is generated when a relevant event occurs therein. When the size of the imaged area of one sector ("background") becomes smaller, the relative strength of the radiation signal from a person to be monitored ("foreground") increases because in the absolute smaller background the same size foreground—and accordingly radiation emanating from it—becomes relatively larger.

A facetted radiation guiding member may be provided somewhere in the radiation path towards the radiation sensor 11 for providing the desired spatial fragmentation. It may, for example, be provided at the common first radiation guiding member 13, particularly in the area 52 in FIG. 5a, which may be situated in one or more peripheral portions of a radiation guiding member and which may surround it ring-like. Or it may be for the second radiation guiding member 31. The individual facets 55 may be plane or concave or convex. The overall global cross sectional shape of the facetted radiation guiding member may be plane or concave or convex, shaped, for example, in dependence of space coverage considerations. A more concave global cross section of a mirror may keep the space sectors corresponding to the individual facets close together, whereas a plane or even convex shape may spread them out in space.

Features described in this specification shall be deemed combinable with each other also when this is not said explicitly, as far as the combination is not excluded for technical reasons. Likewise, features may be used separately from each other also when they are described here in combination with each other, as far as the remaining feature combination is technically useful and remains within the broadest described concept of the invention.

The invention claimed is:

1. A radiation sensing device for sensing a first radiation, comprising;
   a radiation sensor for sensing the first radiation; and
   a first radiation guiding member forming at least a part of a first radiation path for guiding the first radiation towards the sensor,
      wherein the first radiation guiding member also forms at least a part of a second radiation path for guiding second radiation, emitted by an illumination device, and
      wherein the radiation sensor is part of a sensor circuit and the illumination device is part of an illumination circuit, and the illumination circuit is adapted to switch on the visible light illuminator in accordance with a detection signal from the sensor circuit; and
   a second radiation guiding member forming at least a part of said first radiation path.

2. The device of claim 1, further comprising a signaling interface configured to output information obtained in accordance with the sensor output, the interface configured to output signals towards a dedicated wire or superimpose signals on a power supply line or using a wireless interface.

3. The device of claim 1, wherein the radiation sensor and the illumination device have a common power supply and/or one or more common control signal lines.

4. The device of claim 1, wherein the radiation sensor and the illumination device have a common substrate and/or a common control circuit.

5. The device of claim 4, wherein the substrate has two principal surfaces, the sensor and the illumination device being provided on the same or on different principal surfaces.

6. The device of claim 1, wherein the first radiation guiding member has first and second radiation guiding regions which provide first and second focusing regions or focusing spots, respectively.

7. The device of claim 1, further comprising isolation means for providing thermal isolation between the radiation sensor and the illumination device, the isolation means comprising a radiation barrier and/or a heat conduction barrier and/or a venting structure for the sensor.

8. The device of claim 1, further comprising heat flow distribution means for shaping heat flow from the illumination device to the radiation sensor.

9. The device of claim 1, further comprising a sensor circuit, an illumination circuit and a connection amongst them.

10. The device of claim 1, wherein one of the radiation guiding members is attached to the sensor.

11. The circuit of claim 10, further comprising a second control circuit that operates a temperature sensor and a connection amongst said second control circuit and said first control circuit and/or said illumination circuit.

12. The device of claim 1, wherein at least one of the radiation guiding members is adjustable for providing selective spatial sensitivity.

13. The device of claim 1, further comprising one or more of the following features:
   the radiation sensor comprises a thermopile or a bolometer or a pyrodetector or a photo diode or an infrared diode, or an array of such components;
   the illumination device comprises one or more spot type or linear radiation devices;
   a power supply;

the first and/or the second radiation guiding member comprises a mirror or a multi-facetted mirror or a lens or a multi-facetted lens or a Fresnel lens or a multi-facetted Fresnel lens or a phase plate or an interference grid, the first and/or the second radiation guiding member has a radiation converging or radiation focusing design for guiding radiation towards or from a focusing region or focusing spot;

a holding structure for holding the radiation sensor, the illumination device and the radiation guiding member in a defined spatial relationship with respect to each other; and one or more A/D converters between the radiation sensor and/or the illumination device and a digital control circuit;

a memory for holding a control program and/or control data and/or control parameters;

the first radiation path has a focal length of at least 20 mm;

the radiation sensor, the illumination device or a socket for it and the first radiation guiding member are formed as a unit; and the radiation sensor has a housing with a radiation permeable window of a focal length of larger than 50 mm.

14. The device of claim 13, wherein the illumination device is one of the group consisting of an LED, an OLED, and a fluorescent lamp.

15. A control circuit for a device according to claim 1, further comprising:
a first sensor circuit for operating one or more radiation sensors;
an illumination circuit for operating one or more illumination devices;
at least one connection amongst said circuits; and
power supply lines for said circuits.

16. A control circuit according to claim 15, further comprising a signaling interface for said first sensor circuit and said illumination circuit.

17. The radiation sensing device of claim 1, wherein the first radiation comprises infrared radiation.

18. The radiation sensing device of claim 1, wherein the path for guiding converges or focuses the first radiation towards the sensor.

19. The radiation sensing device of claim 1, wherein the second radiation comprises visual radiation.

20. The device of claim 1 wherein the radiation sensing device is configured such that the first radiation reaches the radiation sensor only via the radiation guiding member.

21. The device of claim 20, further comprising a timer for switching off illumination after a certain while after a latest detection signal or event.

22. The device of claim 1, wherein the illumination device is configured to produce regular room illumination.

23. A device comprising:
a sensor circuit comprising an infrared radiation sensor that is coupled to a substrate;
an illumination circuit comprising a visible light illuminator, wherein the illumination circuit is adapted to switch on the visible light illuminator in accordance with a detection signal from the sensor circuit;
a reflective radiation guiding member configured to:
reflect infrared radiation originated from outside the device toward the infrared radiation sensor, and
reflect visible radiation originated from the visible light illuminator in an outward direction from the device,
wherein the illumination circuit is adapted to switch on the visible light illuminator in accordance with a detection signal from the sensor circuit.

24. The device of claim 23, wherein the device is configured such that all of the infrared radiation that reaches the radiation sensor does so only via the reflective radiation guiding member.

25. The device of claim 23, further comprising a timer or sensor circuit for switching off illumination certain while after a latest detection signal or event.

26. The device of claim 23 configured to produce regular room illumination with visible light from the visible light illuminator.

27. The device of claim 23, wherein the visible light illuminator is coupled to the substrate.

28. The device of claim 23, further comprising a second radiation guiding member forming at least a part of said first radiation path.

29. The device of claim 28, wherein the first and/or the second radiation guiding member comprises a mirror or a multi-facetted mirror or a lens or a multi-facetted lens or a Fresnel lens or a multi-facetted Fresnel lens or a phase plate or an interference grid, the first and/or the second radiation guiding member has a radiation converging or radiation focusing design for guiding radiation towards or from a focusing region or focusing spot.

30. A method of controlling a device to produce regular room illumination, the method comprising:
receiving infrared radiation that originated outside the device at the device;
directing the infrared radiation with a first radiation guiding member to an infrared radiation sensor that forms part of a sensor circuit in the device;
producing a detection signal with the sensor circuit;
switching on a visible light illuminator in an illumination circuit in accordance with the detection signal;
directing visible light from the visible light illuminator out from the device with the first radiation guiding member,
wherein the illumination circuit is adapted to switch on the visible light illuminator in accordance with a detection signal from the sensor circuit.

31. The method of claim 30, further comprising switching off the visible light illuminator a certain while after a latest detection signal or event has occurred.

32. The method of claim 30, further comprising timing the certain while with a timer.

33. The method of claim 32, further comprising switching on the visible light illuminator in an illumination circuit in accordance with a subsequent detection signal.

34. The method of claim 30, wherein the radiation guiding member is reflective, such that:
directing the infrared radiation comprises reflecting the infrared radiation, and
directing the visible light comprises reflecting the visible light.

35. The method of claim 30, wherein the infrared radiation sensor and the visible light illuminator are both physically mounted to one single substrate.

36. The method of claim 30, wherein directing the infrared radiation to the infrared radiation sensor is further accomplished using a second radiation guiding member.

37. The method of claim 36, wherein the first and/or the second radiation guiding member comprises a mirror or a multi-facetted mirror or a lens or a multi-facetted lens or a Fresnel lens or a multi-facetted Fresnel lens or a phase plate or an interference grid, the first and/or the second radiation guiding member has a radiation converging or radiation focusing design for guiding radiation towards or from a focusing region or focusing spot.

* * * * *